United States Patent Office 2,743,215
Patented Apr. 24, 1956

2,743,215

NAPHTHA REFORMING REACTIONS CATALYZED BY PLATINUM AND PALLADIUM CATALYSTS

Earl W. Riblett, Tenafly, William P. Burton, Little Silver, and Philip Andrew Lefrancois, Jersey City, N. J., assignors to The M. W. Kellogg Company, Jersey City, N. J., a corporation of Delaware No Drawing. Application August 15, 1951,
Serial No. 242,032

10 Claims. (Cl. 196—50)

This invention relates to improved catalytic reactions involving catalysts containing platinum or palladium; more particularly it is concerned with the conversion of hydrocarbons in the presence of platinum- or palladium-alumina catalysts which were activated or promoted by a certain treatment. These catalysts are described and claimed in our concurrently filed application Serial No. 242,031, filed August 15, 1951, now U. S. Patent 2,662,861.

Many substances have been suggested as catalysts for the conversion of hydrocarbons in a variety of reactions at elevated temperatures including hydrogenation, dehydrogenation, aromatization, cyclization, isomerization, cracking and hydrocracking. Among those employed or suggested for the hydrogenation and dehydrogenation of hydrocarbons and especially for the reforming or hydroforming of naphtha fractions, which involves most or all of the aforementioned reactions, have been catalysts containing minor quantities of platinum or palladium dispersed on a major proportion of an alumina carrier. Various methods for the preparation of such catalysts are known to the art, for example, one method calls for precipitating the platinum onto alumina as platinous oxide by boiling $K_2PtCl_4$ and then reducing the oxide with suitable reducing salts. In another process a chloroplatinic acid solution is treated with hydrogen sulfide to form a suspension which is stirred into a slurry of alumina gel. After drying, the mass is calcined at high temperatures to produce an active platinum on alumina catalyst. For reasons not fully understood at present, platinum-alumina and palladium-alumina catalysts of the same metal content prepared by methods which appear to differ only slightly often produce very different results in hydrocarbon conversion and other catalytic reactions. This indicates that there are profound differences in these superficially similar catalysts. Consequently, the catalytic activity, selectivity of products, etc. obtained in reactions catalyzed with such contact materials cannot be predicted with any certainty.

An object of the invention is to provide improved catalytic reactions utilizing platinum or palladium catalysts.

Another object of the invention is to provide an improved method for catalyzing hydrocarbon conversion reactions with a platinum- or palladium-containing catalyst.

A further object of the invention is to provide an improved method for catalytically altering the hydrogen-carbon ratio of a hydrocarbon.

Still another object of the invention is to provide an improved method for reforming naphthas.

A still further object of the invention is to provide an improved method for hydroforming petroleum fractions in the presence of hydrogen and a platinum- or palladium-containing catalyst.

Other objects of the invention will be apparent to those skilled in the art, especially upon consideration of the detailed description herein below.

In one aspect, the present invention relates to carrying out reactions susceptible to catalysis by platinum or palladium with a catalyst prepared by fixing platinum or palladium on a suitable support from a mixture of a substance containing a metal of the group consisting of platinum and palladium and a promoting or activating substance of the group consisting of mercury, zinc, cadmium and their compounds. It further contemplates performing hydrocarbon conversion reactions with such catalysts, especially those in which the hydrogen-carbon ratio of a hydrocarbon is altered.

Among the numerous reactions which lend themselves to catalysis in the presence of contact materials of the type disclosed herein are dehydrogenation, hydrogenation, hydrogenolysis, isomerization, oxidation, aromatization, cyclization, hydrodesulfurization, hydrocarbon synthesis, dealkylation, dehydroxylation, alkylation, polymerization and hydrogen exchange systems. In general, these reactions may be carried out under the conventional reaction conditions of temperature, pressure, etc., with the catalysts described herein. However, in many instances the activity of the new contact materials permits the employment of less severe conditions, especially lower temperatures and contact times, without any sacrifice in selectivity. A wide variety of organic compounds may be dehydrogenated including naphthenes, paraffins, alkyl radicals in aralkyl compounds, butene, sterols, glycerides and many other organic compounds. By changing the reaction conditions in known manner, these catalysts are also effective for hydrogenating organic compounds in general, and especially fatty glycerides and olefins. They may also be employed in the hydrogenolysis of nitrobenzene to aniline and similar chemical changes. The dehydroxylation or demethylation, or both, of cresylic acid-type compounds may also be carried out in the presence of such contact materials. Among the substances which can be isomerized with these catalysts, paraffins and naphthenes are the most significant feeds from a commercial standpoint; but polyalkyl aromatics may be similarly treated, as exemplified in the catalytic transformation of o-xylene to p-xylene. The contact materials of the present invention are especially suitable for cracking in the presence of hydrogen as in the hydroforming process in which the feed is customarily a low octane naphtha. In hydroforming by the present catalytic process a substantial degree of sulfur removal occurs and the reaction may readily be shifted to favor hydrodesulfurization rather than reforming by changing the reaction conditions in a manner familiar to those skilled in the art. The synthesis of hydrocarbons from carbon monoxide and hydrogen in the presence of the new contact materials is also contemplated. In the field of oxidative reactions, numerous changes can be effected with the present catalysts including, inter alia, the transformation of sulfur dioxide to sulfur trioxide, the formation of nitric acid and also hydrazine from ammonia, the conversion of urea into hydrazine and the oxidation of hydrocarbons in general. The contact materials employed in the present invention are also suitable for hydrogen exchange systems as exemplified by the hydrogenation of coal with decalin and tetralin. By reason of their aromatizing and cyclizing characteristics they are outstanding in preparing benzene, toluene and the like in substantial yields from paraffins and naphthenes and also for the production of more highly cyclized compounds such as naphthalene, anthracene and alkyl-substituted derivatives thereof under suitable conditions. In addition, polymerization and alkylation reactions are responsive to these catalysts; for example, the polymerization of olefins and the alkylation of aromatic compounds.

The most important process according to the present invention is the hydroforming of petroleum fractions to improve their anti-knock ratings. Many benefits are obtained in comparison with known hydroforming processes, including those employing platinum-containing catalysts. After partial deactivation due to the deposition of carbonaceous matter during hydroforming, the contact materials disclosed herein have been repeatedly regenerated by combustion in an oxygen-containing gas with substantially full restoration of activity. Such adaptability to regeneration is extremely important, as it permits a broad variety of feed stocks to be processed successfully, including those of substantial olefin or sulfur contents and/or having end points considerably in excess of 400° F. This is not believed to be true of the presently used platinum reforming catalysts which appear to be non-regeneratable and are thought to require a carefully prepared feed stock of low olefin and sulfur content and having a final boiling point well below 400° F. and to be limited to rather mild hydroforming conditions in order to minimize the formation of deactivating deposits on the contact material in the conversion reaction. No such concern over the feed in the present process is necessary, as carbonaceous and sulfur-containing substances are readily removed during the regeneration operation. Moreover, severe hydroforming conditions may be freely used as required in the production of higher anti-knock fuels. In addition to being superior to all known hydroforming catalysts in activity and the quantity of aromatics produced, superior flexibility and high selectivity have also been noted in comparison with other known platinum reforming catalysts, especially in the higher octane ranges; and the novel platinum-alumina catalysts are unmatched by regeneratable hydroforming catalysts in low production of carbonaceous deposits. Many economies in investment and operating costs are realized with the present hydroforming process as a result of the smaller reactor, smaller separate regeneration vessel in a continuous system, longer on-stream period in a fixed bed system or lower regenerated catalyst replacement rate in a continuous system as well as the improved product selectivity.

The preferred supports or carrier materials for the platinum or palladium are alumina and mixtures of alumina and silica, but other suitable supports include, inter alia, silica gel, titania, charcoal, pumice, kieselguhr, zirconia, magnesia and the like. The various forms of adsorptive alumina, that are capable of adsorbing gases on the surface of the alumina, which have been found useful previously in catalyst compositions for hydrocarbon conversion reactions, particularly those used for dehydrogenation, may be used as the supporting material here; and, in view of the temperatures encountered in hydroforming and regeneration, a refractory substance is recommended. In this category are the aluminas derived from the synthetic alumina hydrate, known as gibbsite, obtained by precipitation from a sodium aluminate solution in the Bayer process and bayerite which may be produced by fusing bauxite with sodium carbonate and employing carbon dioxide as a precipitant; however, the synthetic hydrated gel formed by precipitating a solution of an aluminum salt, such as aluminum chloride or sulfate, with ammonium hydroxide appears to be the best. Although silicon compounds may be introduced in a number of ways in forming silica-alumina gels, the addition of silicon tetrachloride to the soluble aluminum salt prior to precipitation with ammonia is recommended. This silicon compound hydrolyzes to silica gel. In preparing catalysts for the present processes, it is recommended that the alumina be mixed as an undried hydrate with the dispersion containing the platinum or palladium. For alumina and silica-alumina gels, the best results in dispersing the platinum or paladium have been obtained by peptizing the gel with acetic acid or other suitable agent to a pH of from about 3.0 to about 8.0 and preferably between about 4.0 and 6.0 to provide a thin workable mixture, desirably before adding the platinum or palladium compound and the promoting or activating agent which may be mercury, zinc, cadmium or a compound thereof.

It is also contemplated that an alumina gel carrier may include stabilizers designed to improve the resistance of the catalyst to extreme regeneration temperatures. Where storage of the alumina is required by manufacturing considerations, the alumina may be dried and temperatures below about 400° F. are suggested for the purpose. The expression "gel" is employed in its broad sense herein in connection with alumina and silica to denote anhydrous aluminas and silicas as well as hydrates thereof, which are in gel form, derived from gels or capable of forming gels by suitable adjustment of the acidity.

An unusual effect results from the incorporation of a minor proportion of silica gel into the catalysts used in the present processes in that cracking is inhibited, at least under hydroforming conditions. This is surprising, because the use of substantial proportions of silica in a platinum on silica-alumina catalyst has been recommended as a cracking component, and silica gel is a well-known constituent of petroleum cracking catalysts. Although comparatively little cracking occurs when hydroforming naphthas according to the present invention with the platinum- and palladium-alumina catalysts, even this cracking is reduced considerably rather than increased by the addition of small quantities of silica to the catalysts, this being demonstrated by the very low carbon and dry gas yields in the hydroforming experiments described hereinafter. Inasmuch as carbon deposits deactivate the catalyst and higher conversion of the feed into liquid rather than gaseous hydrocarbons is desired, the incorporation into the catalysts of silica in amounts which inhibit cracking is an important aspect of the present invention. Such quantities of silica also seem to enhance the resistance of the catalyst to high temperatures during regeneration, etc. In general, these effects are accomplished with amounts of silica ranging from about 0.1 to about 15.0% of the total weight of the carrier or supporting material, and the preferred percentages extend from about 1 to about 10%.

The final catalyst may contain a small amount of combined halogen, especially if it is desired to promote cracking for any reason. In such case, the halogen may be introduced in the form of hydrofluoric or hydrochloric acid into a slurry of alumina before or after incorporation of the activator and platinum or palladium salt.

The promoting or activating agent of this invention is added during the catalyst preparation. Generally, the promoting agent can be added to (1) the carrier material either before or after drying and/or reaching calcination temperatures and before admixed with the platinum or palladium compound; (2) the platinum or palladium compound prior to admixture with the carrier material; or (3) the mixture of the carrier material and platinum or palladium compound either before or after drying. The promoting agent can be used in the form of an organic or inorganic compound of mercury, zinc or cadmium, or mixtures of the foregoing compounds. The inorganic compounds of mercury, zinc and cadmium include the oxides, hydroxides and salts thereof. The inorganic salts of mercury, zinc and cadmium include, for example, the chlorides, chlorates, bromides, nitrates, sulfates, nitrites, sulfides, sulfites, carbonates, bicarbonates, oxychlorides, fluorides, iodides, phospates, phosphites, etc. Specific examples of inorganic compounds of mercury, zinc and cadmium are mercuric bromide, mercuric chlorate, mercuric chloride, mercuric cyanide, mercuric nitrate, zinc acetate, zinc bromide, zinc chlorate, zinc hydroxide, zinc nitrate, zinc sulfide, cadmium acetate, cadmium carbonate, cadmium hydroxide, cadmium cyanide, cadmium iodide, etc.

The organic compounds of mercury, zinc and cadmium which are useful as promoting agents include a variety of classes, such as for example, the salts of the aliphatic and aromatic carboxylic acids, the aliphatic and aromatic sulfur acids, as well as the aliphatic and aromatic phosphorous acids, etc. Particularly useful compounds of mercury, zinc and cadmium are the aliphatic carboxylate salts such as those derived from the fatty acids, the carbonic acids, the thiocarbonic acids, etc. Specific examples of promoter salts of the aliphatic carboxylic acids are the monobasic types, such as for example, mercurous acetate, mercuric propionate, mercuric butyrate, mercuric valerate, zinc acetate, zinc formate, zinc caproate, cadmium acetate, cadmium propionate, cadmium heptanoate, mercury ethyl carbamate, mercury propyl carbamate, zinc butyl carbamate, cadmium pentyl carbamate, mercury ethyl xanthate, zinc propyl xanthate, cadmium butyl xanthate, etc. The aliphatic polycarboxylic acids can also be used. Useful mercury, zinc and cadmium salts of aromatic carboxylic acids can be of the mono- or polybasic type. Examples of such salts are mercurous benzoate, zinc benzoate, cadmium benzoate, mercuric phthalate, zinc phthalate, cadmium phthalate, mercurous salicylate, zinc salicylate, cadmium salicylate, etc.

It is preferred that the promoting agent volatilize from the catalyst mass at or before calcination temperatures. In some instances the promoting agent is not volatilized at such temperatures, consequently the calcination operation may be conducted under sub-atmospheric pressures in order to remove substantially all or completely the promoting agent from the catalyst mass. Moreover, it is preferred to employ promoting agents which volatilize from the catalyst mass at a temperature not greater than about 1200° F. It should not be understood that the promoting agents described above are equivalent in efficacy for the purposes of this invention, because under certain conditions some are more desirable or effective than others.

In preparing the catalysts for the present invention an activator and a solution or dispersion of a platinum- or palladium-containing substance are mixed with the carrier. Upon heating, metallic platinum or palladium is fixed on the supporting material. The activating substance or reaction products thereof may remain in the final catalyst in certain instances but preferably this is volatilizable matter, that is, matter which evaporates or decomposes at or below either the temperature at which the catalyst is calcined or the operating temperatures at which the catalyst is maintained during conversion or regeneration reactions; these temperatures usually being less than about 1050° F.

The action of the activator is not understood at present but it produces some effect on the catalyst which greatly enhances its activity over catalysts prepared in the same manner with the activating substance omitted. The selectivity of the novel contact materials is also superior, at least in the production of 10 lb. R. V. P. gasoline in hydroforming. Whatever may be the change in the catalyst resulting from the introduction of the activator into the mixture of constituents from which the catalyst is manufactured, it is not necessary that the activating material remain in the final catalyst; in fact the preferred activators are substances which volatilize below about 1000 or 1050° F. and apparently leave no trace of residue therefrom in the finished catalyst. Although suitable activating substances include mercury, zinc, cadmium and compounds thereof, it should not be presumed that these materials produce exactly the same results with platinum- or palladium-containing contact materials, as the volatilizable compounds of mercury, especially when introduced as the more soluble mercuric salts, are considered greatly superior to the others. The quantity of activating material may vary considerably. Based on the weight of the alumina or other carrier, it may be employed in amounts equivalent to about 0.01 to 10.0 per cent or more of the activating metal, quantities ranging from about 0.5 to about 5.0% being especially recommended. For instance, a mercury salt should be mixed with alumina gel in such proportions as to provide a Hg:Al$_2$O$_3$ dry weight ratio of from 0.0001 to 0.1 or higher.

The platinum or palladium is desirably commingled with the other ingredients of the new catalysts in the form of a suspension or slurry. Such suspensions are readily prepared by saturating an aqueous solution of chloroplatinic or chloroplatinous acid, various platinum ammine complexes, and the equivalent palladium compounds with hydrogen sulfide. In H$_2$S-treated chloroplatinic acid, the metal is believed to be present chiefly as a finely-divided precipitate or suspension of platinic sulfide, but it is likely that some of the sulfide is converted to oxysulfide by reaction with oxygen in the air especially during prolonged stirring. In addition, some of the platinum may be in the elementary form. Regardless of the exact composition of the products resulting from the hydrogen sulfide treatment, they are accurately described herein as a sulfurized platinum-containing slurry. Compounds other than the sulfides may also supply the necessary platinum or palladium; for example, chloroplatinic acid, ammonium and potassium chloroplatinates and chloroplatinites, the corresponding palladium compounds, and the like may be added directly to the carrier. Substances readily decomposable, or reducible to metallic platinum or palladium by heating or the action of reducing agents are thought to produce the best catalysts. The metallic platinum or palladium content of the final catalyst should be between about 0.01 and 5.0% by weight. High activities for platinum catalysts have been obtained with those containing from 0.1 to 1.0% of the metal; and increasing the proportion of platinum above 1.0% of the contact material apparently does not increase the activity thereof sufficiently to justify the cost of the additional metal. Platinum is preferred over palladium as it yields a catalyst of higher activity for some reactions, including the hydroforming of naphtha. Mixtures of these two metals are also within the scope of this invention.

In preparing a platinum- or palladium-alumina catalyst, alumina or silica-alumina gel is desirably washed substantially free of halides and any alkalies, that is to halogen and alkali contents below about 0.1% by weight on a dry basis, and slurried in water or other suitable liquid. Then, the activator and the platinum or palladium compound are introduced. It is recommended that both of these materials be added as solutions or dispersions in any suitable liquid which is compatible with the other components of the mixture. For best results, the gel should be peptized with an acid to thin it, thereby promoting even distribution of the platinum or palladium compound. While excellent results have been obtained by thoroughly mixing the mercuric salt or other activating material with the carrier prior to the addition of the platinum or palladium compound, there is evidence that adding the platinum or palladium salt to the peptized gel before introducing the mercury compound produces an equally good and possibly a superior catalyst. Upon mixing the sulfurized platinum-containing slurry and the mercury salt solution, it is believed that at least a portion of the mercury is precipitated as mercuric sulfide by H$_2$S dissolved in the water.

After the activator and platinum or palladium compound have been thoroughly mixed with the carrier material, it is dried and calcined. In the case of alumina gel carriers and the like, the drying temperature is not critical; heating to 210–250° F. for about 15 to 50 hours is suggested, or the slurry may be flash dried and calcined by being placed in an oven maintained at the calcining temperature, for example, 1000° F. If so desired, the dried material may be charged into a catalytic conversion reactor and calcined in situ. During the heating, the platinum or palladium compound or compounds are decomposed or reduced to the metal which is fixed on the carrier, all mercury-containing substances are driven off and the gel is converted from the hydrated form to the anhydrous state. In cases where a pelleted catalyst is desired, the contact material is dried and partially calcined, cooled, mixed with a mold lubricant if necessary, pelleted and recalcined. Regardless of whether the catalyst is calcined in one or two stages, it should be heated to a temperature above about 400° F., but not exceeding the temperature at which substantial deactivation of the catalyst commences, for a period of from about 2 to about 6 or more hours. In general, it is not considered safe to exceed about 1500° F. unless a stabilizer such as silica gel is incorporated in the carrier; otherwise permanent deactivation of the catalyst is likely to occur. It is preferred to calcine alumina gels bearing platinum or palladium between about 600 and about 1200° F. for about 3 to 6 hours. Thermal decomposition appears to be the best method of reducing the platinum or palladium compound, but it is also contemplated that this may be accomplished by passing hydrogen over the dry material while heating to only moderately elevated temperatures. Also, the metal may be deposited on alumina gel before drying by the addition of a reducing agent such as hydrazine or citric acid to the slurry. In heating a mixture of a sulfurized platinum-containing slurry, alumina gel and a mercuric salt, it appeared that the platinum was reduced to the metal about or slightly after the stage at which the mixture became dry.

CATALYST I

In preparing catalyst I, alumina gel was formed by adding a mixture of 4400 ml. of C. P. concentrated ammonium hydroxide (28% NH₃ by weight) with stirring to a solution of 5682 gm. of aluminum chloride hexahydrate in 18 liters of water. To facilitate the stirring which was continued for 45 minutes, 2 additional liters of water were used. The resulting slurry had a pH value of 6.98 at 28.5° C. Filtration required a little less than 2 hours. The alumina filter cake was then washed for 45 minutes in 16 liters of dilute ammonium hydroxide (0.28% NH₃ by weight), thereby forming a slurry with a pH of 7.93 at 21.5 C. After again filtering off the liquid over a period of 2½ hours, the alumina was washed in the same manner 6 more times. In the seventh wash slurry the pH had increased to 10.20 at 22.5° C. Two succeeding washes of the same volume followed in which the ammonia concentration was halved and the pH of the ninth wash slurry was 10.46. In a tenth wash the ammonia content was again halved and the pH of the slurry was determined to be 10.30. A final wash was made with 16 liters of water alone to yield a slurry with a pH of 10.04, and only a faint trace of chloride ions was found in the filtrate. Upon slurrying this washed alumina in 3 liters of water for 30 minutes, analysis showed 13.10 weight per cent or a total of 1135 gm. of Al₂O₃ in the mixture. 63.9 ml. of glacial acetic acid, equivalent to 0.1 mol of acid per mol of alumina, was mixed with an equal volume of water and used to peptize the slurry by reducing the pH thereto to 4.5. This changed the thick viscous gel to a water-thin sol. A solution of 18.05 gm. of C. P. mercuric acetate in 100 ml. of water and 3 ml. of glacial acetic acid was added to one-half of the peptized alumina slurry. After agitating for 15 minutes, the pH of the slurry was found to be 4.16 at 24° C. A brownish-black sulfurized platinum-containing slurry was prepared by saturating 400 ml. of a solution containing 8 gm. of chloroplatinic acid hexahydrate with hydrogen sulfide for 30 minutes. Upon thoroughly stirring the platinum sulfide slurry into the mixture of mercury salt and peptized alumina, a final pH of 4.8 was obtained at 25.5° C. The resulting pale cream-yellow slurry, which bore a thick layer of foam, was transferred to a large porcelain evaporating dish and dried in an unventilated electric oven for 65 hours at 240° F. While the main body of the dried catalyst was tan in color, a ⅛" thick layer of gray solid was observed on the bottom of the dish. The dried mass was ground in a coffee mill, calcined at 1000° F. for 3 hours and found to weigh 584 gm. The catalyst without additives was then pelleted into 3/16" diameter pills and calcined for another 3 hours at 1000° F. The finished pellets were gray in color and slightly speckled with black. Gravimetric analysis of a 5-gm. sample indicated that the finished catalyst contained 0.46% platinum and was free of mercury.

CATALYST II

For purposes of comparison, a platinum-alumina gel catalyst II was prepared in substantially the same manner as catalyst I except for one essential difference in that no mercury compound was added. Accordingly, reactions catalyzed by this unpromoted catalyst are not within the scope of the present invention. After drying the wet catalyst overnight at 240° F., a black shiny coating was observed on top of the dried mass which was of a dull gray color. The solids were then calcined for 2 hours at 1000° F., formed into 3/16" pellets using 2 per cent of aluminum stearate as a lubricant and recalcined for 4 more hours at 1000° F. The platinum content was found to be 0.47%.

CATALYST III

Catalyst III containing metallic platinum dispersed on a gel carrier consisting of alumina gel with a very small proportion of silica gel therein was prepared to test the effect of silica on the catalyst. 2841 grams of aluminum chloride hexahydrate (equivalent to 600 grams of Al₂O₃) were dissolved in 10 liters of water along with 23 ml. of silicon tetrachloride (equivalent to 6 grams of SiO₂). After precipitating with 2228 ml. of concentrated ammonium hydroxide (28% NH₃), the slurry was stirred for one hour. At this time the pH was 7.04 at 25° C.; then the alumina-silica gel was filtered and washed twelve times with a slightly ammoniacal water in the manner described in preparing catalyst I until the filtrate gave an almost negative chloride test. Water alone was employed in the 13th and final wash. The precipitate was slurried in 1½ liters of water and small samples withdrawn for analysis. The Al₂O₃ content of the slurry was 9.57 per cent and X-ray tests indicated that it was predominately bayerite with some gibbsite present. Next, the slurry was peptized with a total of 45 ml. of glacial acetic acid in 45 ml. of water, using high speed stirring, thereby bringing the pH to 4.53 at 26° C. After stirring the pure white slurry for ½ hour, a solution of 19 gm. of C. P. mercuric acetate (equivalent to 2 per cent Hg based on the Al₂O₃) in 100 ml. of water and 3 ml. of glacial acetic acid was introduced. No color change occurred at this point and the pH was 4.31 at 25° C. after stirring for 30 minutes. Meanwhile, a sulfurized platinum-containing suspension was prepared by dissolving 8 grams of chloroplatinic acid hexahydrate in sufficient water to make 400 ml. of the solution; then the solution was saturated by bubbling hydrogen sulfide through for about 30 minutes. The resulting brownish-black suspension was added to the peptized alumina slurry and changed the color of the slurry from white to yellowish brown. It appeared that this addition formed a brown precipitate in the slurry, but the obscuring color of the platinum-containing suspension precludes a positive statement on this point. After stirring the mixture for about 45 minutes the pH was found to be 4.28 at 26° C. Next, the slurry was dried in two porcelain evaporating dishes for 21 hours in an unventilated oven at 230–240° F. Then the incompletely dried solids were mixed together in one of the dishes and dried for 24 more hours. It was observed that a dark-gray spongy material had settled to the bottom. The dried mass was ground in a coffee mill, calcined for about 6 hours at 1000° F. and formed into pellets which had a faintly speckled, light gray appearance. Analysis indicated that the finished catalyst contained 0.45 per cent platinum and 1.89 per cent SiO₂ but was free of mercury.

For a fuller understanding of the nature and objects of the invention, reference should be had to the following examples which are set forth in the table below merely to further illustrate the invention and are not to be construed in a limiting sense. Approximately 400 gram quantities of the catalyst pellets produced as described above were utilized in hydroforming experiments conducted with several naphthas in a fixed bed laboratory reactor. The results of these examples are reported in the table below as well as the reaction conditions. It will be noted that most of the examples employed a mid-continent heavy naphtha of relatively high end point. This is a difficult stock to hydroform by reason of its relatively low naphthenic content and its tendency to form relatively large carbonaceous deposits on a catalyst; hence it provides a severe test for hydroforming catalysts.

The catalysts had been regenerated before each example, except Example No. 5. This operation was carried out by purging the catalyst with hydrogen after the fresh catalyst had become partially deactivated by the accumulation of deposits of carbonaceous matter thereon during hydroforming; then the pressure on the system was released and it was purged with nitrogen. Next, the contact material was heated to 950° F. and air was introduced along with the nitrogen. The concentration of air in this stream was regulated to produce a maximum temperature of 1050° F. in the catalyst bed during the combustion period. During this operation the temperature of various points in the bed was ascertained with two thermocouples, one located in the upper part, and one in the lower part of the bed. The flow of nitrogen and air through the bed was continued for one-half hour after both thermocouples had returned to 950° F. readings. Following another nitrogen purge, the system was again placed under hydrogen pressure for about one hour while the hydrogen rate and temperature were being adjusted; then the naphtha vapor was cut into the system.

referring to the yields and octane ratings of both the 100% $C_4$-recovery reformate and the 10 p. s. i. R. V. P. reformate. In Example 3, catalyst III, a promoted catalyst of the present invention of small silica content was substituted for catalyst I. The most salient differences between Examples 2 and 3 are the substantial decrease in cracking as indicated by the large reduction in the carbon and dry gas (composed of hydrogen and $C_1$-$C_3$ hydrocarbons). This result was particularly surprising since silica gel has long been regarded as a promoter rather than an inhibitor for cracking reactions, even when present in minor amounts in hydroforming catalysts. Example 4 is similar to Example 3 except for the reduction of the space velocity which was accompanied by the production of a somewhat smaller yield of a somewhat higher octane product. Examples 5 to 7 were carried out with catalyst I under more favorable pressure conditions and serve to demonstrate the extreme activity as well as the wide flexibility of the present promoted catalysts in producing reformates of moderate as well as very high anti-knock quality. Example 8 resembles Example 7 except that superior results were obtained with a different mid-continent heavy naphtha of considerably lower end point; this feed being far more susceptible to hydroforming. In this connection it should be noted that the feed in Examples 1 to 7, inclusive, is one of the most difficult feeds to process in hydroforming; thus the extremely low carbon and dry gas yields in Example 2, and even lower figures for Examples 3 and 4, conclusively demonstrate the low cracking tendencies of the present process. Example 9 was performed with catalyst I and still another feed stock. In general, the

*Table*

| Example No. | 1 | 2 | 3 | 4 | 5 | 6 | 7 | 8 | 9 |
|---|---|---|---|---|---|---|---|---|---|
| Catalyst | II | I | III | III | I | I | I | I | I |
| | Mid-Continent Heavy Naphtha | | | | | | | | Mixed Gulf Coast |
| Feed Naphtha: | | | | | | | | | |
| Initial B. P.—° F | 230 | 230 | 230 | 230 | 230 | 230 | 230 | 204 | 226 |
| End B. P.—° F | 428 | 428 | 428 | 428 | 428 | 428 | 428 | 373 | 354 |
| Octane No.—CFRM | 29.9 | 29.9 | 29.9 | 29.9 | 29.9 | 29.9 | 29.9 | 39.1 | 47.4 |
| Vol. Percent Aromatics | 9 | 9 | 9 | 9 | 9 | 9 | 9 | | 12.4 |
| Conditions: | | | | | | | | | |
| Reaction Press.—p. s. i. g | 500 | 500 | 500 | 500 | 250 | 250 | 250 | 250 | 250 |
| Space Velocity—w./hr./w | 2.06 | 3.14 | 2.97 | 2.08 | 1.02 | 3.00 | 4.16 | 4.09 | 1.51 |
| $H_2$ Rate—C. F./Bbl. Feed | 5,270 | 4,860 | 4,880 | 4,880 | 4,512 | 4,870 | 4,913 | 4,942 | 5,299 |
| Av. Reaction Temp.—° F | 875 | 895 | 900 | 900 | 901 | 876 | 861 | 853 | 902 |
| Catalyst Regenerations [1] | 1 | 9 | 3 | 2 | 0 | 1 | 2 | 5 | 8 |
| Yields—Output Basis: | | | | | | | | | |
| $C_4$—Free Reformate—Vol. Percent | 88.0 | 81.0 | 85.8 | 81.4 | 73.6 | 84.0 | | 85.6 | 76.3 |
| 100 Percent $C_4$ Reformate [2]—Vol. Percent | 93.0 | 88.8 | 90.8 | 89.4 | 82.7 | 89.2 | | 90.8 | 84.7 |
| 10# R. V. P. Reformate—Vol. Percent | 99.0 | 90.7 | 95.6 | 90.4 | 83.1 | 93.0 | | 96.1 | 85.2 |
| Dry Gas—Wt. Percent | | 9.5 | 5.9 | 7.8 | | | | | |
| Carbon—Wt. Percent | | 0.09 | 0.015 | 0.015 | | | | | |
| Octane Rating: | | | | | | | | | |
| 100 Percent $C_4$ Reformate—CFRM | 69.6 | 80.3 | | | 89.2 | 80.7 | 73.8 | 78.0 | 87.8 |
| 100 Percent $C_4$ Reformate—CFRR | 75.3 | 87.8 | 84.8 | 90.5 | 100.6 | 89.7 | 81.1 | 85.9 | 99.1 |
| 10# R. V. P. Reformate—CFRM | 70.8 | 80.6 | | | 89.4 | 81.3 | 74.8 | 78.5 | 87.8 |
| 10# R. V. P. Reformate—CFRR | 76.8 | 88.0 | 85.7 | 90.6 | 100.6 | 90.3 | 82.5 | 86.8 | 99.1 |
| $C_4$-Free Gasoline: | | | | | | | | | |
| Aromatics Content—Vol. Percent | 36.9 | 49.3 | 48.6 | 51.7 | 71.7 | 56.1 | 49.0 | 47.3 | 67.1 |

[1] Number of times catalyst was regenerated by combustion prior to the run.
[2] Total liquid recovered.

Referring to the experimental data tabulated above, it will be apparent that Examples 1 to 4, inclusive, were made under comparable process conditions with substantial variations in space velocities. Example 1 was performed over the unpromoted platinum-alumina comparison catalyst II, whereas in Example 2, mercury-promoted catalyst I was employed. With catalyst I, a striking increase in the production of aromatics as well as in catalyst activity was observed. In regard to the latter, it will be seen that there was a considerable increase in the anti-knock quality of the product of Example 2 even at the 50% higher space velocity. Moreover, a distinct improvement in selectivity is apparent upon reaction conditions approximate those of Example 5, superior results being obtained because of the greater susceptibility of this particular feed to hydroforming.

In hydroforming naphtha, gasoline or kerosene stocks according to the present invention with the catalysts disclosed herein, the conditions may be varied rather widely; thus temperatures of about 600 to about 1050° F. are suitable and the preferred range is from about 800 to about 950° F. Within these temperature limits, weight space velocities of about 0.05 to about 10.0 pounds of naphtha per hour per pound of catalyst in the reaction zone may be employed advantageously; however, space velocities of about 0.25 to about 5.0 provide the best results. Hydrogen should be introduced into the hydroforming reactor at rates running from about 0.5 to about 20.0 mols of hydrogen per mol of hydrocarbon reactants. This hydrogen may be in admixture with light gaseous hydrocarbons; in fact, it is usually introduced by recycling the normally gaseous products of the hydroforming reaction, which are composed chiefly of hydrogen along with about 5–10% of 1 to 3 carbon hydrocarbons. The hydrogen serves an important function in maintaining the activity of the contact material by minimizing coke deposition thereon. While the total reaction pressure may be maintained at any value between about 50 and about 1000 pounds per square inch gage (p. s. i. g.), the best results are obtained by holding the reaction pressure within the range between about 100 and about 750 p. s. i. g. In any event, the hydrogen pressure should not be allowed to become so great under any given set of reaction conditions that destructive hydrogenation is inaugurated, as this will result in a net consumption rather than a net production of hydrogen in the reaction.

Although the examples were carried out with a fixed bed of catalyst pellets, the present process is not limited to hydroforming naphtha in the particular manner. The catalyst may also be in lump, granular or powdered state, and these may be used with equal success in both fluidized systems and those employing moving beds of granular contact material in either concurrent or countercurrent flow relative to the reactants. With a powdered contact material, it is contemplated that the catalyst may be circulated through the reaction or regeneration zones or both as a relatively dilute dispersion in a high velocity stream of reactant or regeneration gases, or may be present in one or both of these zones as a dense phase bed through which the gases pass upwardly. In the latter instance, there may be a fixed bed of contact material in which the hydroforming and regeneration operations are conducted alternately; however, the preferred arrangement includes separate reaction and regeneration zones with either intermittent or continuous circulation of the catalyst therebetween to maintain the desired activity in the hydroforming bed of catalyst.

Regeneration of the partially deactivated catalyst is preferably accomplished by combustion in a stream of oxygen-containing gas. To avoid excessive regeneration temperatures, flue or other inert gases may be mixed with air or other cooling means may be employed. However, the contact materials disclosed herein can be regenerated, at least in part, by contact with a hydrogen-containing gas such as recycled product gas. In some instances, it may be desirable to combine these treatments either occasionally, or regularly, by first burning off the carbonaceous deposits in an oxygen-containing gas and then treating the regenerated catalyst with hydrogen. Such hydrogen treatments may be necessary to fully reactivate a catalyst where the hydrocarbon feed has a high sulfur content as combustion alone apparently will restore most, but not all, of the activity of a catalyst used with a feed of this nature.

The catalysts disclosed herein are described and claimed in our concurrently filed application Serial No. 242,031, now U. S. Patent 2,662,861.

Since certain changes may be made in the processes described without departing from the scope of the invention, it is intended that all matter contained in the above description shall be interpreted as illustrative and not in a limiting sense.

We claim:

1. A process for reforming a naphtha which comprises subjecting the naphtha under reforming conditions to contact with a catalyst which is a product prepared by a process which comprises mixing a volatilizable substance of the group consisting of mercury, zinc, cadmium and their compounds and a minor proportion of a compound containing a metal of the group consisting of platinum and palladium with a slurry of a major proportion of an alumina carrier, and calcining the resulting mixture at a temperature of about 400° to about 1500° F. for a period sufficient to convert the said metal to a metallic residue on the alumina carrier and volatilize substantially all of the volatilizable substance therefrom.

2. A process for reforming a naphtha which comprises subjecting the naphtha under reforming conditions to contact with a catalyst which is a product prepared by a process which comprises mixing a solution of mercuric acetate and a sulfide of platinum-containing slurry with a peptized alumina gel and calcining the resulting mixture at a temperature of about 400° to about 1500° F. for a period sufficient to convert the said platinum sulfide to a metallic residue on the alumina gel and volatilize substantially all of the mercury containing substance therefrom.

3. A process for reforming a naphtha which comprises subjecting the naphtha under reforming conditions to contact with a catalyst which is a product prepared by a process which comprises mixing at a pH between about 3.0 and 8.0 an aqueous solution of a volatilizable mercury compound in minor proportion and a peptized slurry of alumina gel in major proportion with a sufficient quantity of a compound containing a metal of the group consisting of platinum and palladium to produce a dry catalyst containing between about 0.01 and about 5.0 per cent by weight of said metal, and heating the resulting mixture to a maximum temperature above about 400° F. and below the temperature at which deactivation of the catalyst commences, thereby volatilizing substantially all mercury-containing substances and converting the said metal compound to a metallic residue on the alumina gel.

4. A process for reforming a naphtha which comprises subjecting the naphtha under reforming conditions to contact with a catalyst which is a product prepared by a process which comprises mixing at a pH between about 3.0 and 8.0 an aqueous solution of mercuric acetate in minor proportion and a peptized slurry of alumina gel in major proportion with a sufficient quantity of a decomposable platinum compound to produce a dry catalyst containing between about 0.01 and about 5.0 per cent platinum by weight, and heating the resulting mixture to a maximum temperature above about 400° F. and below the temperature at which substantial deactivation of the catalyst commences, thereby volatilizing substantially all mercury-containing substances therefrom and converting the platinum compound to a metallic residue on the alumina gel.

5. A process for reforming naphtha which comprises subjecting a mixture of the naphtha and from about 0.5 to about 20.0 mols of hydrogen per mol of naphtha to a temperature between about 600 to about 1050° F. and a total pressure between about 50 and about 1000 pounds per square inch gage at an hourly weight space velocity between about 0.05 and about 10.0 while in the presence of a catalyst which is a product prepared by a process which comprises mixing a substance of the group consisting of mercury, zinc, cadmium and their compounds and a compound containing a metal of the group consisting of platinum and palladium with a supporting material, and calcining the mixture at a temperature of about 400° to about 1500° F. for a period sufficient to convert the said metal compound to a metallic residue on the supporting material.

6. A process for reforming naphtha which comprises subjecting a mixture of the naphtha and from about 0.5 to about 20.0 mols of hydrogen per mol of naphtha to a temperature between about 600 to about 1050° F. and a total pressure between about 50 and about 1000 pounds per square inch gage at an hourly weight space velocity between about 0.05 and about 10.0 while in the presence of a catalyst which is a product prepared by a process which comprises mixing a solution of a volatilizable mercury compound and a minor proportion of a compound containing a metal of the group consisting of platinum and palladium with a major proportion of an adsorptive alumina carrier, and calcining the resulting mixture at a temperature of about 400° to about 1500° F. for a period sufficient to convert the said metal compound to a metallic residue on the adsorptive carrier and volatilize substantially all of the mercury containing substance therefrom.

7. A process for reforming naphtha which comprises subjecting a mixture of the naphtha and from about 0.5 to about 20.0 mols of hydrogen per mol of naphtha to a temperature between about 600 to about 1050° F. and a total pressure between about 50 and about 1000 pounds per square inch gage at an hourly weight space velocity between about 0.05 and about 10.0 while in the presence of a catalyst which is a product prepared by a process which comprises mixing a solution of mercuric acetate and a sulfide of platinum-containing slurry with a peptized alumina gel and calcining the resulting mixture at a temperature of about 600° to about 1200° F. for a period of about 2 to about 6 hours thus converting the platinum sulfide to a metallic residue on the alumina gel and volatilizing substantially all of the mercury containing substances therefrom.

8. A process for reforming naphtha which comprises subjecting a mixture of the naphtha and from about 0.5 to about 20.0 mols of hydrogen per mol of naphtha to a temperature between about 600 to about 1050° F. and a total pressure between about 50 and about 1000 pounds per square inch gage at an hourly weight space velocity between about 0.05 and about 10.0 while in the presence of a catalyst which is a product prepared by a process which comprises mixing an aqueous solution of mercuric acetate with an aqueous slurry of a peptized alumina gel at a pH between about 4.0 and about 6.0 in such proportions as to provide a Hg:$Al_2O_3$ ratio between about 0.0001 and about 0.1 by weight, mixing the resulting slurry with a sulfide of platinum-containing slurry in such proportions as to produce a dry catalyst with a platinum content between about 0.1 and about 1.0 per cent by weight and heating the mixed slurries to a maximum temperature between about 600° F. and about 1200° F. to dry the solids, volatilize substantially all mercury-containing substances therefrom and converting the platinum sulfide to a metallic residue on the alumina gel.

9. A process which comprises reforming a naphtha by subjecting the naphtha under suitable reforming conditions to contact with a catalyst which is a product prepared by the method which comprises mixing a volatilizable mercury compound, a compound of platinum and a carrier material, and calcining the mixture at a temperature of about 600° to about 1200° F. and for a period sufficient to convert the platinum compound to a metallic residue on the support material.

10. A process for reforming a naphtha which comprises subjecting the naphtha under reforming conditions to contact with a catalyst which is a product prepared by the process which comprises mixing a substance of the group consisting of mercury, zinc, cadmium and their compounds and a compound containing a metal of the group consisting of platinum and palladium with an adsorptive carrier material, and calcining the mixture at a temperature of about 400° to about 1500° F. and for a period sufficient to convert the said metal compound to a metallic residue on the adsorptive carrier material.

References Cited in the file of this patent

UNITED STATES PATENTS

| | | |
|---|---|---|
| 1,925,820 | Reyerson | Sept. 5, 1933 |
| 2,479,110 | Haensel | Aug. 16, 1949 |
| 2,487,564 | Layng | Nov. 8, 1949 |